Dec. 7, 1965 L. I. CHASE ETAL 3,222,605

LOW PASS, LOW LEVEL FILTER

Filed July 1, 1963 2 Sheets-Sheet 1

INVENTOR.
LAURENCE I. CHASE
FRANCIS C. DOUGLAS

BY

ATTORNEYS

INVENTOR.
LAURENCE I. CHASE
FRANCIS C. DOUGLAS
BY
Reynolds & Christensen
ATTORNEYS 3,222,605

LOW PASS, LOW LEVEL FILTER

Laurence I. Chase and Francis C. Douglas, Seattle, Wash., assignors to The Boeing Company, Seattle, Wash., a corporation of Delaware Filed July 1, 1963, Ser. No. 291,742
3 Claims. (Cl. 328—209)

This invention relates to stabilized low-pass electrical filters using feedback amplifiers to sharpen cut off of the filter response characteristic. A broad object hereof is to provide a simplified dynamic filter of this type in which amplifier drift is not a problem. The invention is herein illustratively described by reference to its preferred form as applied to presample filtering in multi-channel telemetering systems; however, it will be recognized that certain modifications and changes therein with respect to details may be made without departing from the essential features involved.

The transmission of a plurality of slowly varying direct current signals (i.e. representing pressure, temperature, etc.) over a multi-channel time sharing telemetering link presents the difficult problem of eliminating random noise frequency components which could combine with the sampling frequency to produce components in the low-frequency region of interest and thereby produce false signal values. Accordingly, it has been found desirable in a practical case to reject from the respective transmitting channels, before commutation, all frequency components above substantially half of the sampling rate while passing undistorted the widest possible spectrum of useful signal information below the point of cut off. This required a low-pass, high-fidelity filter with very sharp cut off at its upper-frequency end and not subject to D.C. drift which could be mistaken for a change of low-level data value. It is also meant for many applications in which the data originated in a remote system, such as an earth's satellite, that the system used must be highly compact, low in power requirement, light in weight and of noncritical design and operation.

Conventional dynamic or dynamically compensated filters using low-drift direct-current amplifiers introduced D.C. losses and a degree of D.C. drift which was excessive for many applications. They required circuit complications to minimize drift over an operating range equivalent to the full range of potential variation of D.C. signal values.

A further object of this invention is to devise a filter system as effective, or more so, in its operating characteristics but altogether eliminating the above problems of former circuits.

A related object is to provide such a filter system suitable to be produced in relatively simple, inexpensive and compact form. In this way it becomes possible to employ a separate filter for each of a large number of telemetering channels without adding unduly to the overall system size, weight or complexity. A related object is to provide an improved transistorizable R-C low-pass filter circuit low in distortion and simple in the design requirements of the amplifier.

In accordance with this invention the required channel signal components are passed through an R-C network of passive elements in operative association with a dynamic (amplifier) network which is not in the direct-current signal transfer path of the filter but which, through A.C. coupling to such path, becomes operative in the cut-off region to sharpen the cut-off characteristic as desired. Thus isolated from D.C. level of the amplifier the filtered signals are not affected by amplifier drift, and the amplifier itself need be only of the simplest form to amplify A.C. components in the cut-off region. It need not be stabilized against drift and its operating limits need not be determined by the full range of D.C. signal variation in the telemetering system. In practice the amplifier is primarily a current amplifier and its voltage gain may be less than unity depending upon the values of the passive elements in the network.

These and other features, objects and advantages of the invention will become more fully evident from the following description thereof by reference to the accompanying drawings.

Figure 1:
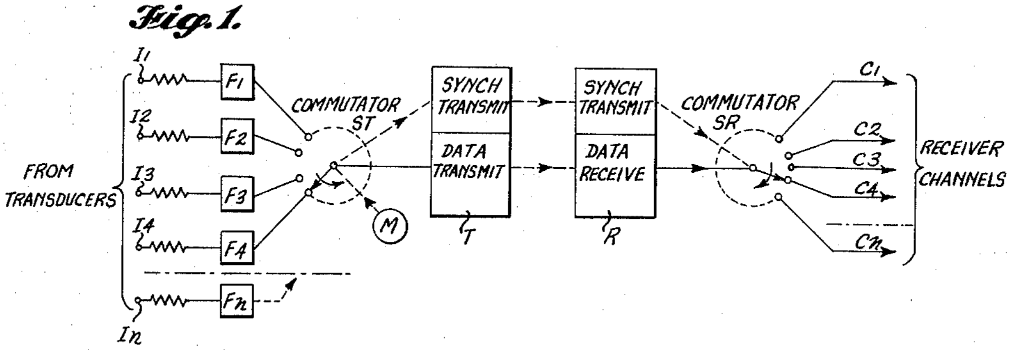
FIGURE 1 is a simplified diagram of a multi-channel telemetering system of a type in which the invention is particularly useful.

Referring to FIGURE 1, the illustrated multi-channel telemetering system comprises a series of data (D.C. signal) transducer inputs I1, I2, I3 . . . $I_n$ connected respectively through filters F1, F2, F3 . . . $F_n$ to corresponding stationary contacts of a commutator switch $S_t$. The switch $S_t$ operates cyclically to sample the different channel signals successively and recurringly for application thereof to the data transmitter T shared by the channels. The telemetering receiver R has its output connected to the rotor of a similar commutator switch $S_r$ suitably synchronized with the transmitting commutator switch $S_t$ as indicated. Stationary contacts of the receiving commutator switch are connected to suitable output leads C1, C2, C3 . . . $C_n$ which are to carry the reproduced values of the original D.C. signals. The function of the filters F1, F2, etc. is to pass the low-level direct-voltage signals, including low-frequency alternating components inherent therein, from the respective transducers to the commutator $S_t$ while highly attenuating frequency components higher than half the sampling rate. Such higher-frequency components may be caused, for example, by excessive frequency response of the transducers or by noise pickup in the transducers or in the leads extending therefrom to the commutator. As previously explained these frequency components, if not attenuated, would lead to the generation of low-frequency aliasing error voltages in the sampled outputs applied to the data transmitter T because of their interaction with the sampling frequency during the sampling operation.

Figure 2:
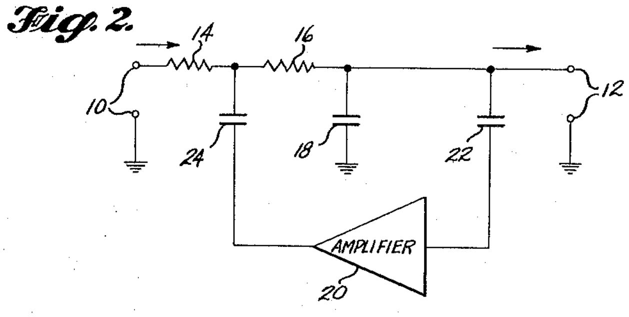
FIGURE 2 is a simplified diagram of a filter embodying the invention.

A filter system of this invention achieving the described results is depicted in FIGURE 2. This filter comprises input terminals 10, output terminals 12 and a passive low-pass network comprising the interconnected resistances 14 and 16 and the condenser 18. Resistances 14 and 16 are in series and provide a direct-current signal transfer path between the input and output terminals. The condenser 18 is in shunt to the output terminals 12. If desired, additional passive elements could be added to the network, including additional R-C network stages similar to one shown. In accordance with the invention a dynamic auxiliary network comprising amplifier 20 is A.C. coupled at its input through condenser 22 to the load or output terminal 12 and is A.C. coupled from its output through condenser 24 to the junction between resistances 14 and 16. Condenser 24 isolates the output of the amplifier from the signal transfer path 14, 16 and also forms part of the positive feedback arrangement of the amplifier for obtaining the required cut-off region boost in the network's frequency response characteristic. Condenser 22 is intended solely as a low-frequency isolation condenser, although by design may have an effect in establishing the required frequency response characteristic. It will be noted that amplifier 20 is incorporated in a positive feedback loop including the resistor 16 in its load circuit but that the amplifier is completely outside the direct current path of the filter network, so that the amplifier is not affected by signal level in that path nor can amplifier drift appear in the output terminals 12.

It will further be evident that by isolating the amplifier 20 in this manner from the signal transfer path of the filter the amplifier need only amplify A.C. signal components over a limited (upper) portion of the filter spectrum and that it need not accommodate a direct current range commensurate with variations of the data signals being transferred between filter terminals 10 and 12.

Figure 3:
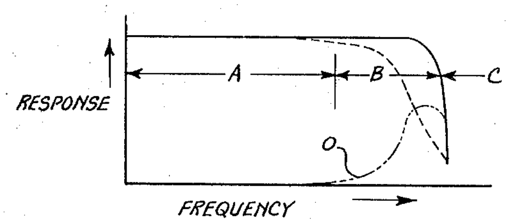
FIGURE 3 is a graphic representation of the low-pass characteristic of the filter.

In FIGURE 3 the composite operating effect of the passive and dynamic portions of the filter shown in FIGURE 2 are depicted. Absent amplifier 20, the filter response characteristic would exhibit the ill-defined or slowly drooping upper cut-off region B identified with a simple R-C passive network. With the amplifier 20 present, the characteristic flat region A is effectively extended upwardly on the frequency scale and the cut-off made much sharper as shown by the solid line representing the characteristic of the composite circuit. To accomplish this result the amplifier 20 is given a frequency response characteristic shown approximately by the dot-dash line O and its response is added to that of the basic passive filter network at a suitable point in the network. It will be noted that amplifier 20 is not or need not be operable for frequency components in the lower portion A of the pass-band nor is it required to be active in the region C beyond the high-frequency cut-off end of the band, inasmuch as the shunt condenser 18 of itself suitably attenuates all frequencies in that upper region.

It will be obvious that variations in the damping or attenuation characteristic of the filter may be achieved by varying the sizes and relative sizes of the passive and active filter network components as well as the gain of the amplifier 20. It will further be obvious that a circuit of this type may be produced in very small and inexpensive form. For example with present-day miniaturized condensers, resistances and transistors a complete filter suitable for operation in a multi-channel telemetering system at a sampling rate of 20 samples per second can be mounted in a package with a cubic placement of but one-half cubic inch.

Figure 4:
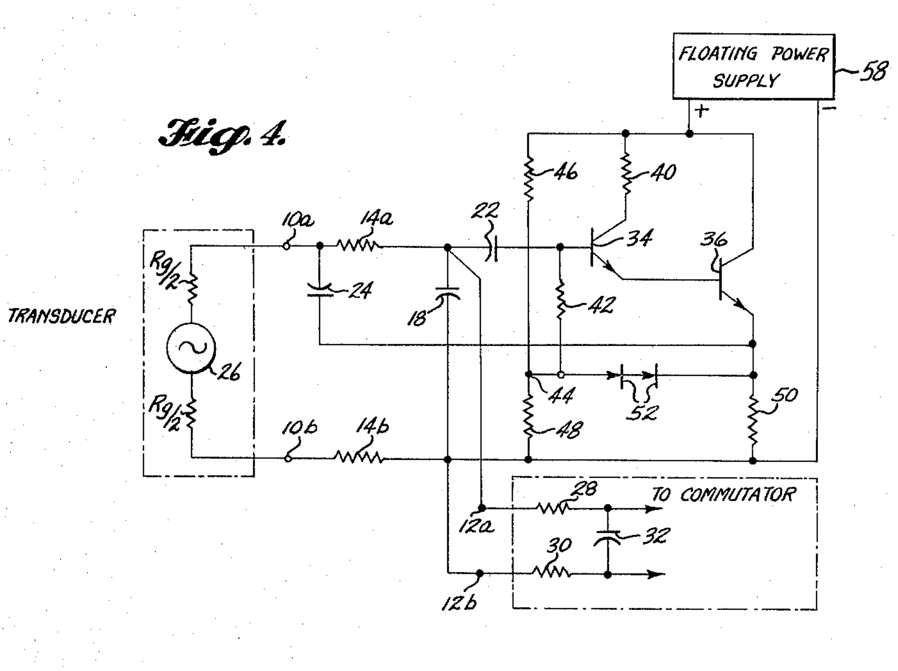
FIGURE 4 is a schematic circuit diagram of a typical filter system, with associated input signal source and output commutator leads.

In FIGURE 4 the specific circuit illustrated comprises the transducer or signal source 26 having an internal impedance which may be represented by the two equal resistances $R_g/2$. The transducer terminals 10*a* and 10*b* represent the filter input terminals. The filter output terminals are designated 12*a* and 12*b*. These are arranged for connection to the commutator through balanced output resistances 28 and 30 across which the shunt condenser 32 is connected. Within the filter proper the transducer leads extend through series resistances 14*a* and 14*b*, which are balanced to balance out noise disturbances originating in the transducer and transducer leads. Shunt condenser 18 is connected across the output terminals 12*a* and 12*b*. Coupling condenser 22 connects the junction of condenser 18 and resistance 14*a* to the base of amplifier transistor 34 whose emitter is connected to the base of amplifier transistor 36. The collector of transistor 36 is connected directly to the positive terminal of a floating power supply 58. The collector of transistor 34 is connected through a load resistance 40 to the same power supply terminal. The base of transistor 34 is returned through a resistance 42 to the junction 44 in a voltage divider network comprising series resistances 46 and 48 connected across the power supply terminals. The emitter of transistor 36 returns to the negative side of power supply 38 through the load resistance 50, and to the input terminal 10*a* through the coupling condenser 24. Diodes 52 cause the input impedance of the amplifier to appear large while permitting proper biasing of the amplifier stages to operate essentially as any emitter-follower. Such a circuit provides no voltage gain, but sufficient current and power gain to defer the roll-off point of the filter response characteristic as desired.

Typical circuit components appear in the following table for the sampling rates designated.

*Typical components (FIGURE 4)*

| | For 20 samples per second (filter cut-off frequency =5.5 cps.) |
|---|---|
| Condensers (Sprague Type 109D): | |
| 24 | 56 μfd. |
| 18 | 8 μfd. |
| 22 | 2.5 μfd. |
| Resistors: | |
| 14*a* | Chosen in test. |
| 14*b* | Chosen in test. |
| 46 | 19.6K. |
| 40 | 75K. |
| 42 | 100K. |
| 48 | 100K. |
| 50 | 5.1K. |
| Diodes 52 | SG22. |
| Transistors: | |
| 34 | 2N1247. |
| 36 | 2N336. |
| Power supply 38 | 10 volts. |
| Input 26 | 20 m.v. |

Figure 5:
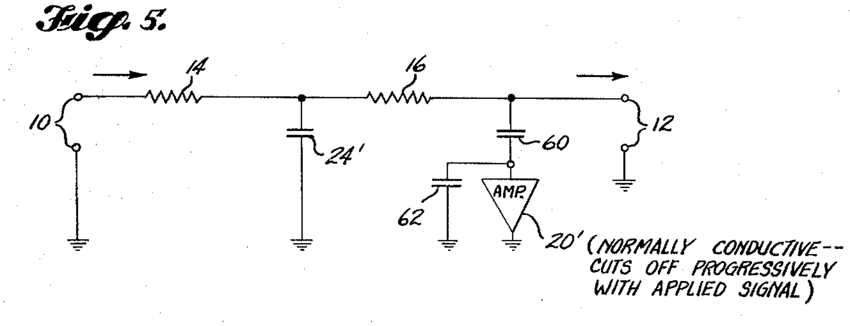
FIGURE 5 is a simplified diagram of a modified filter arrangement.

In the modified embodiment of FIG. 5, the main filter condenser 24' is shunted across the filter between series resistances 14 and 16, while amplifier 20 is arranged in parallel with relatively small shunt output condenser 62 and in series with coupling condenser 60. In this case the amplifier acts normally (i.e. when operating in region A, FIG. 3) as a resistance of low value which becomes progressively energized through coupling condenser 60 as the frequency of signals advances into the range B. As the amplifier becomes less conductive condenser 62 effectively becomes less of a shunt, so as to increase the filter's output impedance and thereby defer droop in the response characteristic as a function of increasing signal frequency. However, as signal frequency moves still higher (into Range C, FIG. 3) the impedance of condenser 60 and 62 becomes so low that the amplifier's effect becomes negligible as in the preceding embodiment.

These and other aspects of the invention will be evident to those skilled in the art referring to the foregoing description of the presently preferred practices thereof.

We claim as our invention:

1. Low-pass dynamic filter means comprising an input, an output, a passive network including interconnected resistance and capacitance elements, said network forming a direct-current signal transfer path between said input and output, said passive network having a low-pass signal transfer characteristic with predetermined upper-frequency region cut off; and dynamic filter network means operatively associated with said passive network and having a response characteristic which varies with frequency in the cut-off frequency region of the passive network, said dynamic filter network means including a positive feedback amplifier having an input responsively connected to the passive network and having an output connected to said transfer path operatively to boost the response of said passive network in said region, and direct-current blocking means comprising first and second capacitors respectively connected in the amplifier input and output connections isolating said amplifier from direct-current components in said transfer path.

2. The filter means defined in claim 1, wherein the said amplifier input connection is coupled to a point in said path nearer said filter means output than the point in said path to which said output connection is coupled.

3. Low-pass filter means comprising an input, an output, a passive network of interconnected resistance and capacitance elements providing a direct-current transfer path, including a series resistance therein, between said input and output, and positive feedback amplifier means having a load circuit including said resistance therein, said amplifier means having a control input capacitance coupled to said network, said load circuit including a direct-current blocking condenser located therein to isolate the amplifier from direct currents in said path.

References Cited by the Examiner

UNITED STATES PATENTS

| | | | |
|---|---|---|---|
| 2,936,426 | 5/1960 | McClean | 333—70 X |
| 3,118,114 | 1/1964 | Barditch | 330—107 X |
| 3,122,714 | 2/1964 | Morris | 333—70 X |

ARTHUR GAUSS, *Primary Examiner.*

JOHN W. HUCKERT, *Examiner.*

M. LEE, *Assistant Examiner.*